(12) United States Patent
Lee et al.

(10) Patent No.: US 12,047,123 B2
(45) Date of Patent: Jul. 23, 2024

(54) COMMUNICATION DEVICE AND OPERATING METHOD THEREOF

(71) Applicant: LG ELECTRONICS INC., Seoul (KR)

(72) Inventors: Dong Sun Lee, Gyeonggi-do (KR); Jeong In Kim, Gyeonggi-do (KR); Sung Ryong Hong, Gyeonggi-do (KR)

(73) Assignee: LG ELECTRONICS INC., Seoul (KR)

( * ) Notice: Subject to any disclaimer, the term of this patent is extended or adjusted under 35 U.S.C. 154(b) by 190 days.

(21) Appl. No.: 17/771,626

(22) PCT Filed: Nov. 5, 2019

(86) PCT No.: PCT/KR2019/014915
§ 371 (c)(1),
(2) Date: Apr. 25, 2022

(87) PCT Pub. No.: WO2021/090967
PCT Pub. Date: May 14, 2021

(65) Prior Publication Data
US 2022/0407613 A1    Dec. 22, 2022

(51) Int. Cl.
*H04B 17/309* (2015.01)
*H04B 7/0404* (2017.01)
*H04L 69/324* (2022.01)

(52) U.S. Cl.
CPC ......... *H04B 17/309* (2015.01); *H04B 7/0404* (2013.01); *H04L 69/324* (2013.01)

(58) Field of Classification Search
CPC .... H04B 7/0404; H04B 17/309; H04L 69/324
See application file for complete search history.

(56) References Cited

U.S. PATENT DOCUMENTS

| 7,164,698 B1 * | 1/2007 | Krishnamurthi | H04J 3/1617 |
| | | | 370/545 |
| 2013/0095875 A1 | 4/2013 | Reuven | |
| 2014/0219140 A1 | 8/2014 | Uyehara et al. | |

FOREIGN PATENT DOCUMENTS

| KR | 10-2014-0009552 | 1/2014 | |
| KR | 10-2014-0033176 | 3/2014 | |
| KR | 10-2016-0081123 | 7/2016 | |
| WO | WO-2012168013 A1 * | 12/2012 | ............. H04B 7/024 |

OTHER PUBLICATIONS

PCT International Application No. PCT/KR2019/014915, International Search Report dated Jul. 22, 2020, 4 pages.

* cited by examiner

*Primary Examiner* — Brian P Cox
(74) *Attorney, Agent, or Firm* — LEE, HONG, DEGERMAN, KANG & WAIMEY

(57) ABSTRACT

A communication device is disclosed. The present communication device may include a master including a communication modem, and multiple slaves including antennas. The communication device may execute an artificial intelligence (AI) algorithm and/or a machine learning algorithm, and may communicate with other electronic devices in a 5G communication environment. Therefore, user convenience can be enhanced.

12 Claims, 10 Drawing Sheets

COMMUNICATION DEVICE AND OPERATING METHOD THEREOF

CROSS-REFERENCE TO RELATED APPLICATIONS

This application is the National Stage filing under 35 U.S.C. 371 of International Application No. PCT/KR2019/014915, filed on Nov. 5, 2019, the contents of which is hereby incorporated by reference herein in its entirety.

TECHNICAL FIELD

The disclosure relates to a communication device including multiple antennas and a method for operating the same.

BACKGROUND ART

When a large area is covered by a single antenna, the problem of a shadow zone occurs. It is the basic concept of a distributed antenna system to install antennas having a relatively small output distributed across multiple places, in order to solve the above problem.

In the case of a distributed antenna system according to the prior art, a radio frequency signal is distributed multiple remote units spaced apart from each other such that reliability can be guaranteed with reduced power, and the coverage is improved.

However, the prior art has a limitation in such expandability is insufficient because application of distributed antennas is restricted to the BS level, and thus introduction of distributed antennas is necessary at the end terminal level.

DISCLOSURE OF INVENTION

Technical Problem

It is an aspect of the disclosure to provide a communication device having a distributed antenna at an end terminal level.

It is another aspect of the disclosure to provide a communication device having a digital serial interface between a distributed antenna and a communication modem.

It is another aspect of the disclosure to provide a communication device configured to select an antenna having excellent reception quality from multiple distributed antennas, thereby transmitting/receiving data.

It is another aspect of the disclosure to provide a communication device configured to have stable reliability when transmitting/receiving data by using multiple distributed antennas.

It is another aspect of the disclosure to provide a communication device configured to recover data loss when transmitting/receiving data between a communication modem and a distributed antenna.

Technical problems to be solved by the disclosure are not limited to the above-mentioned technical problems, and other technical problems not mentioned herein will be clearly understood from the following description by those skilled in the art to which the disclosure pertains.

Solution to Problem

In accordance with an aspect, a communication device according to an embodiment of the disclosure may include multiple slaves each including an antenna, and a master which includes a baseband modem, is disposed to be spaced a predetermined distance apart from each of the multiple slaves, is connected to each of the multiple slaves through a digital serial interface, and includes multiple distributed paths coupled one-to-one with the multiple slaves, respectively.

The master may measure a channel quality of each of the multiple distributed paths, and may determine at least one slave to be used for transmitting or receiving data, based on the measured channel quality.

In accordance with another aspect, an operating method of a communication device according to an embodiment of the disclosure may include measuring a channel quality with respect to multiple distributed paths coupled one-to-one with respective multiple slaves (DS) each including an antenna, and determining at least one slave to be used for transmitting or receiving data, based on the measured channel quality.

More particularly, the measuring of the channel quality may include measuring a channel quality of each of the multiple distributed paths at a predetermined period and each time data is transmitted and received.

The operating method of a communication device may further include mapping the distributed paths and an SP path, based on the measured channel quality.

The operating method of a communication device may further include, in each of one or more SP paths, upon transmission (Tx), generating, as a Tx packet, a Tx data signal and an RF control signal which are input, and selecting one of the one or more SP paths and providing, through the selected SP path, the Tx packet to a distributed path mapped to the selected SP path.

The operating method of a communication device may further include performing P to S encoding on the Tx packet in the distributed path mapped to the selected SP path, and transmitting an encoded Tx data signal and RF control signal to a slave coupled to the distributed path, through the digital serial interface.

The operating method of a communication device may further include, in each of one or more slaves, upon reception (Rx), generating, as an Rx packet, an Rx data signal and an RF status signal which are input, performing P to S encoding and providing an encoded signal to the distributed paths coupled to the slaves, respectively, through the digital serial interface, performing S to P decoding of an encoded signal, which has been input through at least one distributed path, into an S to P decoded signal, and selecting one of the at least one distributed path, and providing the S to P decoded signal to an SP path mapped to the selected distributed path.

The operating method of a communication device may further include receiving an input of the S to P decoded signal so as to generate an Rx data signal and an RF status signal.

Advantageous Effects of Invention

According to various embodiments of the disclosure, multiple distributed antennas may be selective used according to channel quality, and data loss may be resolved, thereby improving the reliability and efficiency of data transmission/reception.

BEST MODE FOR CARRYING OUT THE INVENTION

Figure 1:
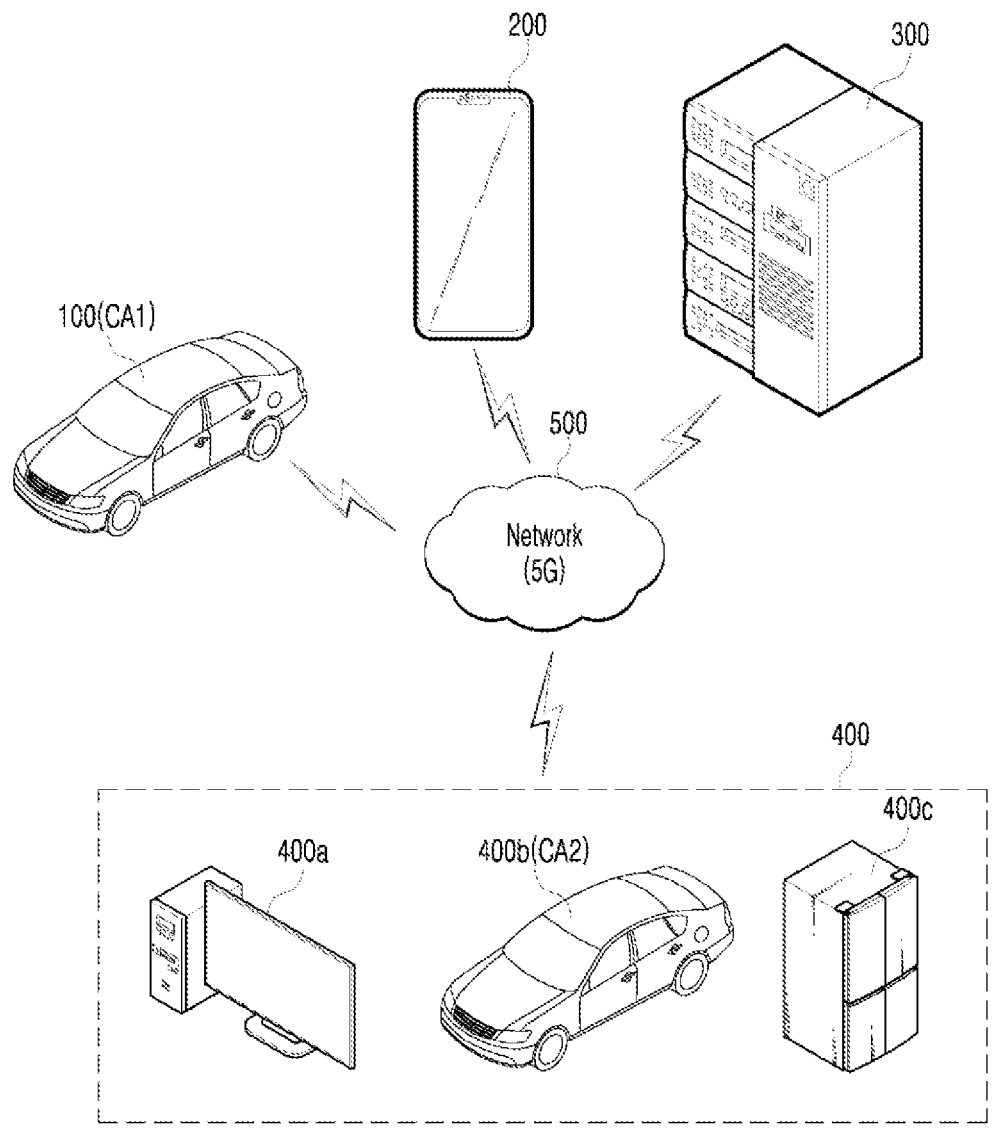
FIG. 1 is a diagram illustrating a cloud system based on a 5G network according to an embodiment of the present disclosure.

Hereinafter, embodiments will be described in detail with reference to the accompanying drawings. Since the embodiments may be modified in various ways and may take various other forms, specific embodiments will be illustrated in the drawings and described in detail herein. However, this has no intention to limit the embodiments to the specific forms disclosed herein, and it should be understood that all modifications, equivalents, and substitutions may be devised within the spirit and technical scope of the embodiments.

Terms such as "first," "second," and other numerical terms when used herein do not imply a sequence or order unless clearly indicated by the context. These terms are only used to distinguish one element from another. In addition, terms specially defined in consideration of configurations and operations of the embodiments are merely used to explain the embodiments and do not limit the scope of the embodiments.

Since various embodiments of the present disclosure may utilize techniques relating to artificial intelligence, artificial intelligence will be generally described below.

Artificial intelligence (AI) refers to a field of studying artificial intelligence or a methodology for creating the same. Moreover, machine learning refers to a field of defining various problems dealing in an artificial intelligence field and studying methodologies for solving the same. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons on different layers, a learning process for updating model parameters, and an activation function for generating an output value.

The ANN may include an input layer, an output layer, and may selectively include one or more hidden layers. Each layer may include one or more neurons, and the ANN may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, hyperparameters refer to parameters which are set before learning in a machine learning algorithm, and include a learning rate, a number of iterations, a mini-batch size, an initialization function, and the like.

The objective of training an ANN is to determine a model parameter for significantly reducing a loss function. The loss function may be used as an indicator for determining an optimal model parameter in a learning process of an ANN.

The machine learning may be classified into supervised learning, unsupervised learning, and reinforcement learning depending on the learning method.

Supervised learning may refer to a method for training an artificial neural network with training data that has been given a label. In addition, the label may refer to a target answer (or a result value) to be guessed by the artificial neural network when the training data is inputted to the artificial neural network. Unsupervised learning may refer to a method for training an ANN using training data that has not been given a label. Reinforcement learning may refer to a learning method for training an agent defined within an environment to select an action or an action order for maximizing cumulative rewards in each state.

Machine learning of an artificial neural network implemented as a deep neural network (DNN) including a plurality of hidden layers may be referred to as deep learning, and the deep learning is one machine learning technique. Hereinafter, the meaning of machine learning may include deep learning.

FIG. 1 illustrates a cloud system 1000 based on a 5G network according to an embodiment of the present disclosure.

Referring to FIG. 1, the cloud system 1000 may include a first communication device 100 mounted on a first vehicle CA1, a mobile terminal 200, a control system 300, various devices 400, and a 5G network 500.

The first communication device 100 may include multiple distributed antennas, and may include a communication modem configured to efficiently control the multiple distributed antennas. The first communication device 100 may be installed in the first vehicle CA1 to communicate with at least one of the mobile terminal 200, the control system 300, the various devices 400, and the 5G network 500.

Additionally, the first communication device 100 may additionally include a multiple input and multiple output (MIMO) module for expanding the capacity of wireless communication.

The mobile terminal 200 may communicate with the first communication device 100 via the 5G network 500, and may transmit a control command to the first communication device 100. The mobile terminal 200 may provide information, based on an image, and the mobile terminal 200 may include mobile devices such as a mobile phone, a smartphone, and a wearable device, for example, a watch-type terminal (smartwatch), a glasses-type terminal (smart glass), and a head mounted display (HMD).

The control system 300 may provide various information to the communication device 100, and respond to various requests from the communication device 100. In an embodiment, the control system 300 may perform a complex operation (for example, a deep learning operation) requested by the communication device 100. To this end, the control system 300 may store various information for performing an operation in a system memory.

The various devices 400 may include a personal computer (PC) 400a, a second communication device 400b mounted on a second vehicle CA2, a refrigerator 400c, and the like. The various devices 400 may be connected to the first communication device 100, the control system 300, and the like via the 5G network 500.

All of the first communication device 100, the mobile terminal 200, the control system 300, and the various devices 400 may be equipped with a 5G module to transmit or receive data at a speed of 100 Mbps to 20 Gbps (or higher). Accordingly, each configuration of the cloud system 1000 may transmit a large-capacity video file to various devices, and may be driven with low power, so that power consumption can be minimized. However, the transmission speed may vary according to an implementation example.

The 5G network 500 may provide a communication environment of devices by wire or wireless, the communication environment including a 5G mobile communication network, a local area network, the Internet, and the like.

The first communication device 100 may transmit and receive data to and from a server and various communicable terminals via the 5G network. Specifically, the first communication device 100 may perform data communication with a server and a terminal by using at least one service among enhanced mobile broadband (eMBB), ultra-reliable and low latency communications (URLLC), and massive machine-type communications (mMTC), via the 5G network.

The enhanced mobile broadband (eMBB) is a mobile broadband service, and provides multimedia contents and wireless data access. In addition, more improved mobile services such as a hot spot and broadband coverage for receiving explosively increasing mobile traffic may be provided via the eMBB. Through a hot spot, high-volume traffic may be received in an area with low user mobility and high density. Through broadband coverage, a wide-range and stable wireless environment and user mobility may be guaranteed.

A ultra-reliable and low latency communications (URLLC) service defines requirements that are far more stringent than the existing LTE in terms of reliability and transmission delay of data transmission and reception, and corresponds to a 5G service for production process automation in an industrial field, telemedicine, remote surgery, transportation, safety, and the like.

A massive machine-type communications (mMTC) service is a transmission delay-insensitive service that requires a relatively small amount of data transmission. The mMTC enables a much larger number of terminals, such as sensors, than general mobile phones to be simultaneously connected to a wireless access network. In this case, the price of a communication module of a terminal should be inexpensive, and improved power efficiency and power saving technology are required such that the terminal can operate for many years without battery replacement or recharging.

Hereinafter, the communication device 100 will be described assuming that the communication device is mounted on the first vehicle CAL but the communication device 100 may be implemented as a separate device without being mounted on a specific device.

Figure 2:
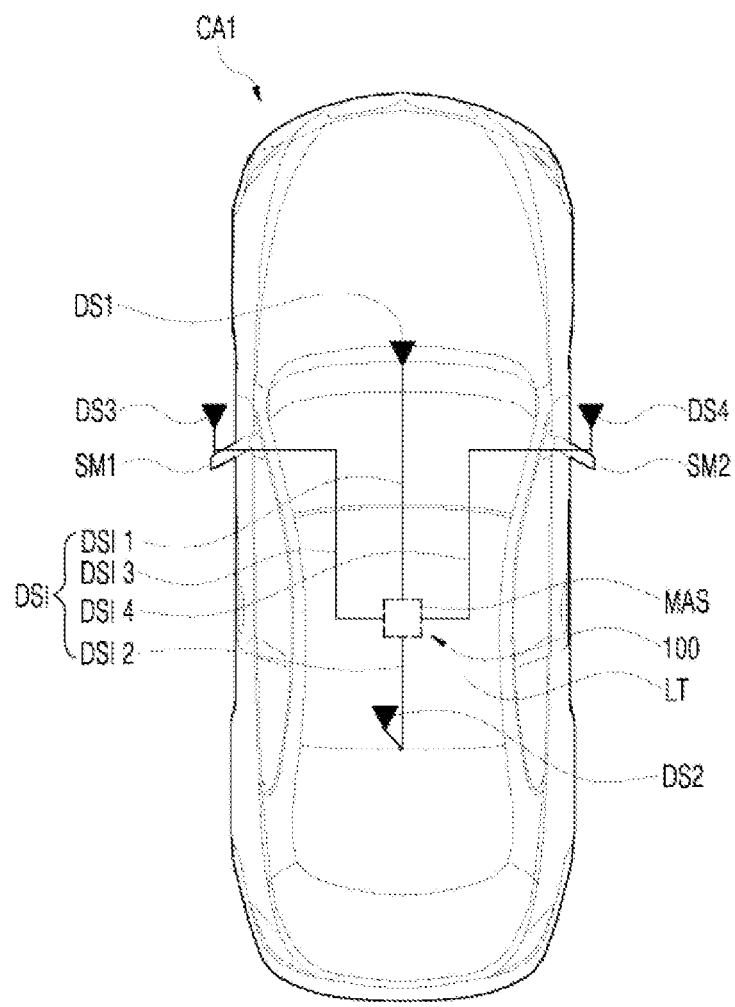
FIG. 2 is a diagram illustrating a communication device mounted on a vehicle according to an embodiment of the present disclosure.

FIG. 2 is a diagram illustrating the communication device 100 mounted on a vehicle according to an embodiment of the present disclosure.

Referring to FIG. 2, the communication device 100 may include multiple slaves DS1 to DS4 and a master (MAS) configured to control the multiple slaves DS1 to DS4.

The master (MAS) includes a communication modem and may control the overall operation of the communication device 100. The master (MAS) may be linked with an electric control unit (ECU) of the vehicle.

The master (MAS) may control the multiple slaves DS1 to DS4, and each of the multiple slaves DS1 to DS4 may be referred to as a slave or a distributed slave DS. The master (MAS) may be disposed to be spaced a predetermined distance apart from the multiple slaves DS1 to DS4.

The master (MAS) may be physically and electrically connected to the multiple slaves DS1 to DS4 through digital serial interfaces (DSI) DSI1 to DSI4. The digital serial interfaces (DSI) are interfaces which support serial communication, and may connect communication entities (MAS) DS1 to DS4 of a long distance (for example, up to 10 meters or more). A conventional digital interface connects a communication entity of a short distance, and the DSI is an improvement on the conventional digital interface.

Each of the multiple slaves DS1 to DS4 may be disposed at a front or rear side DS1 or DS2 of a roof top (LT), and may be disposed at a predetermined position of a side mirror SM1 or SM2, but the embodiment is not limited thereto. Each of the multiple slaves DS1 to DS4 may be connected to a network by using a radio frequency (RF) module.

Figure 3:
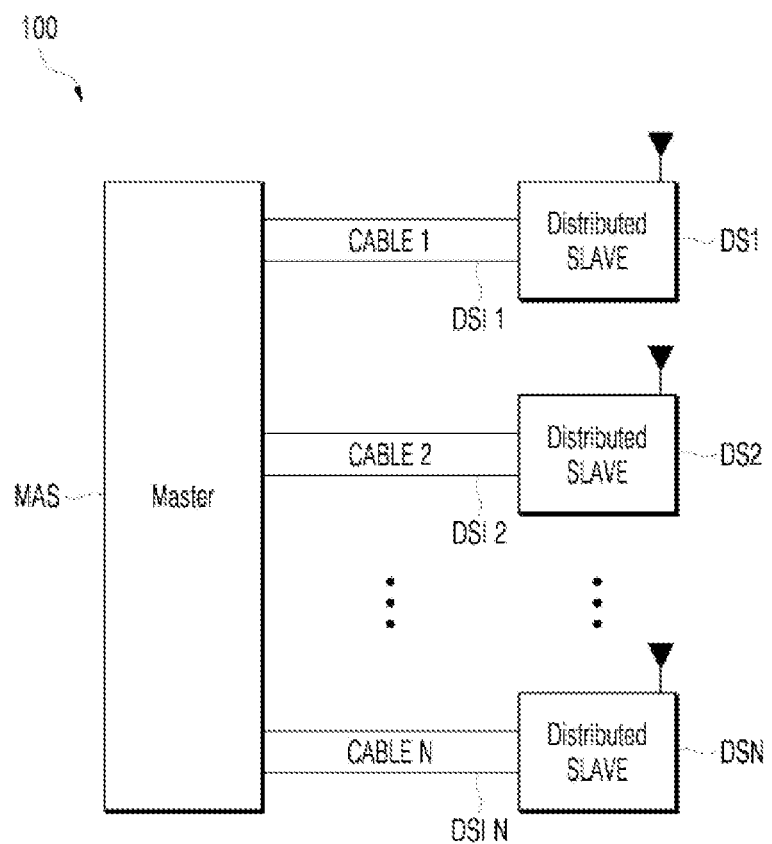
FIG. 3 is a block diagram schematically illustrating a configuration of a communication device according to an embodiment of the present disclosure.

FIG. 3 is a block diagram schematically illustrating a configuration of the communication device 100 according to an embodiment of the present disclosure.

Referring to FIG. 3, the communication device 100 may include the master (MAS), the multiple slaves (DS) DS1 to DSN, and the digital serial interfaces (DSI) DSI1 to DSIN configured to connect the master (MAS) and the multiple slaves (DS) DS1 to DSN.

The master (MAS) may include a baseband communication modem. The master (MAS) may include multiple signal processing (SP) paths corresponding to antenna paths. The multiple signal processing paths may be mapped to the slaves configured to transmit or receive data, and will be described in detail with reference to FIG. 4, and omitted herein.

Each of the multiple slaves DS1 to DSN may include an RF module (for example, DS_RFM in FIG. 4) including an analog to digital converter (ADC), a DAC, various filters (LPF and BPF), various amplifiers (LNA and PA), an RF switch/duplexer, and a splitter, and may receive data/a control signal from a network and telegraph the same to the network.

The communication device 100 may include the digital serial interfaces (DSI) DSI1 to DSIN, each of which is disposed between the master (MAS) and each of the multiple slaves DS1 to DSN. In an alternative embodiment, the digital serial interfaces (DSI) may be implemented as Ethernet communication cables for a vehicle.

By applying the digital serial interfaces, data transmission with high reliability may be performed between the master (MAS) and the multiple slaves DS1 to DSN, and compared to the existing analog interface and digital interface, a distance between the master (MAS) and the multiple slaves DS1 to DSN may be implemented longer. The digital serial interfaces may be implemented as a single channel or a multi-channel according to a required bandwidth.

Figure 4:
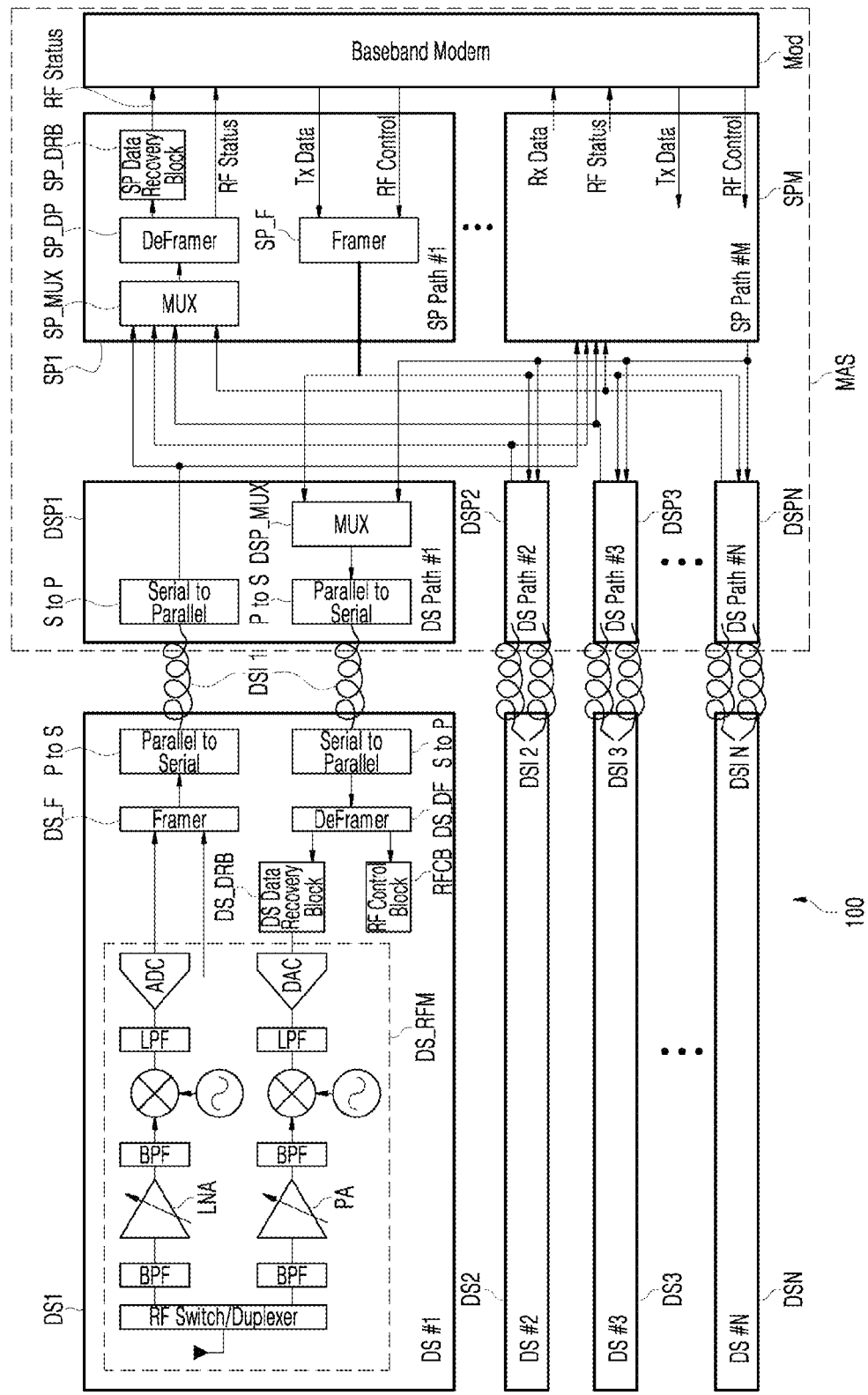
FIG. 4 is a block diagram illustrating, in detail, a function of a communication device according to an embodiment of the present disclosure.
Figure 5:
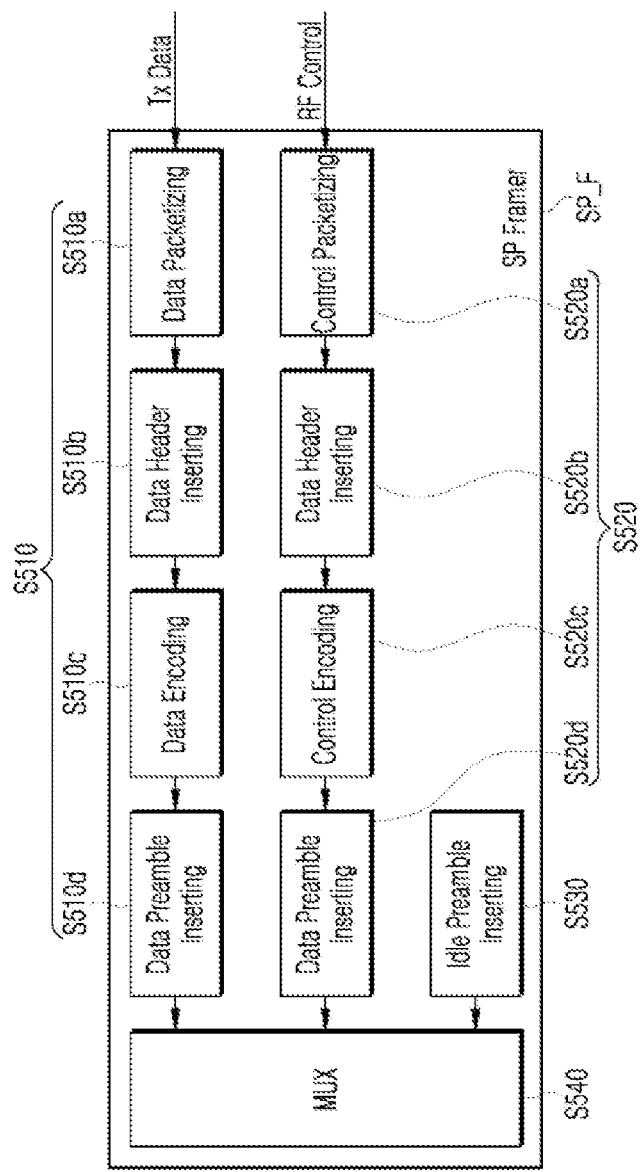
FIGS. 5 and 6 are diagrams illustrating an operation of a communication device in a transmission (Tx) mode according to an embodiment of the present disclosure.
Figure 6:
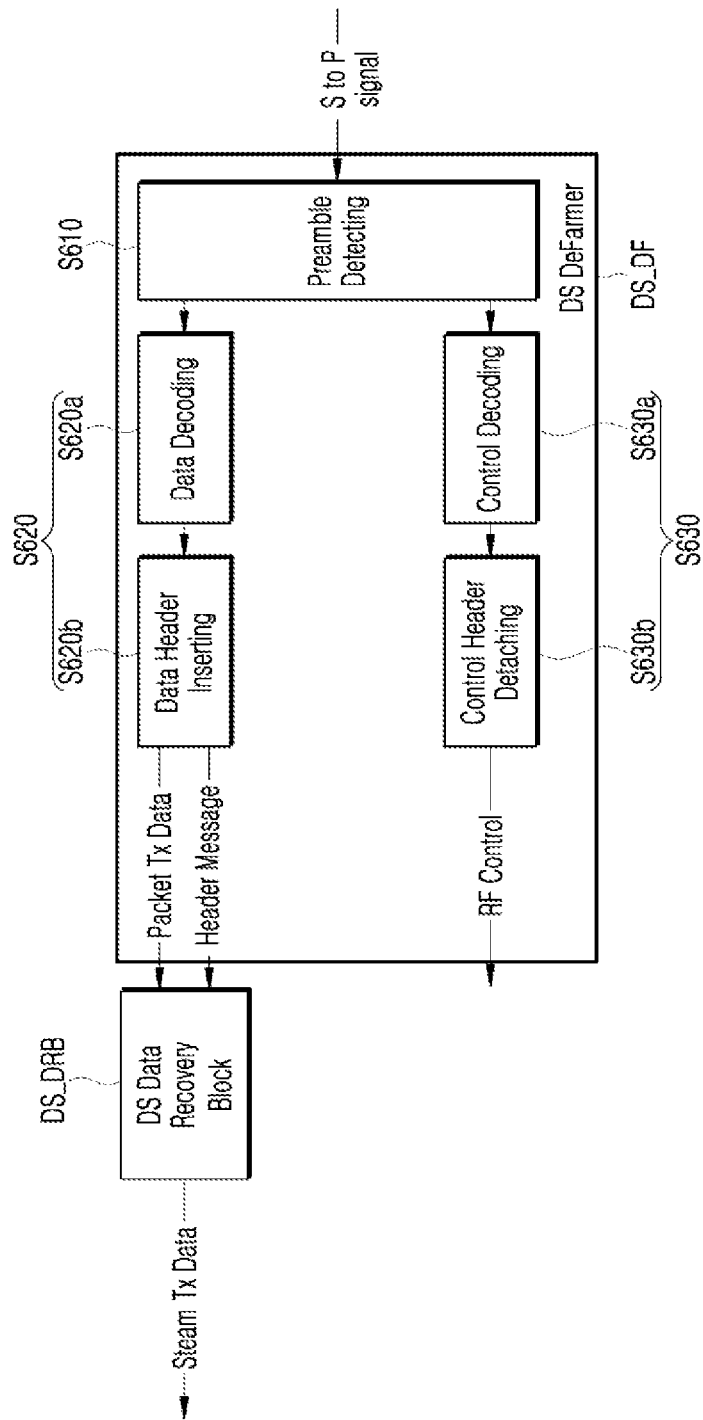
Figure 7:
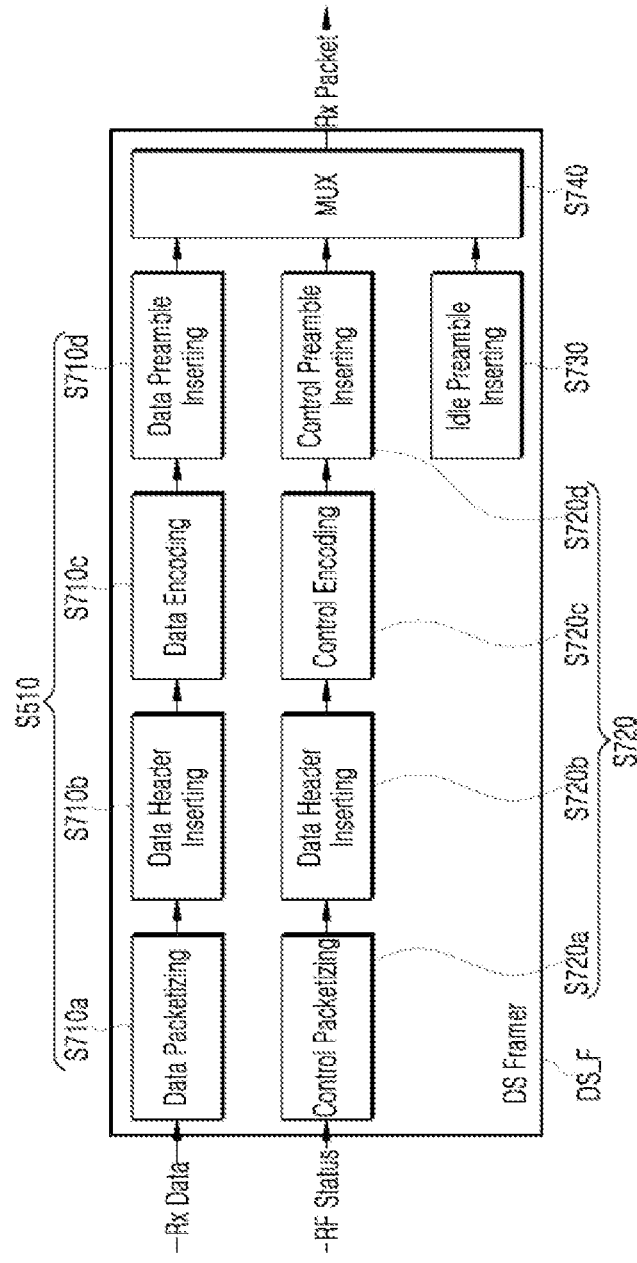
FIGS. 7 and 8 are diagrams illustrating an operation of a communication device in a reception (Rx) mode according to an embodiment of the present disclosure.
Figure 8:
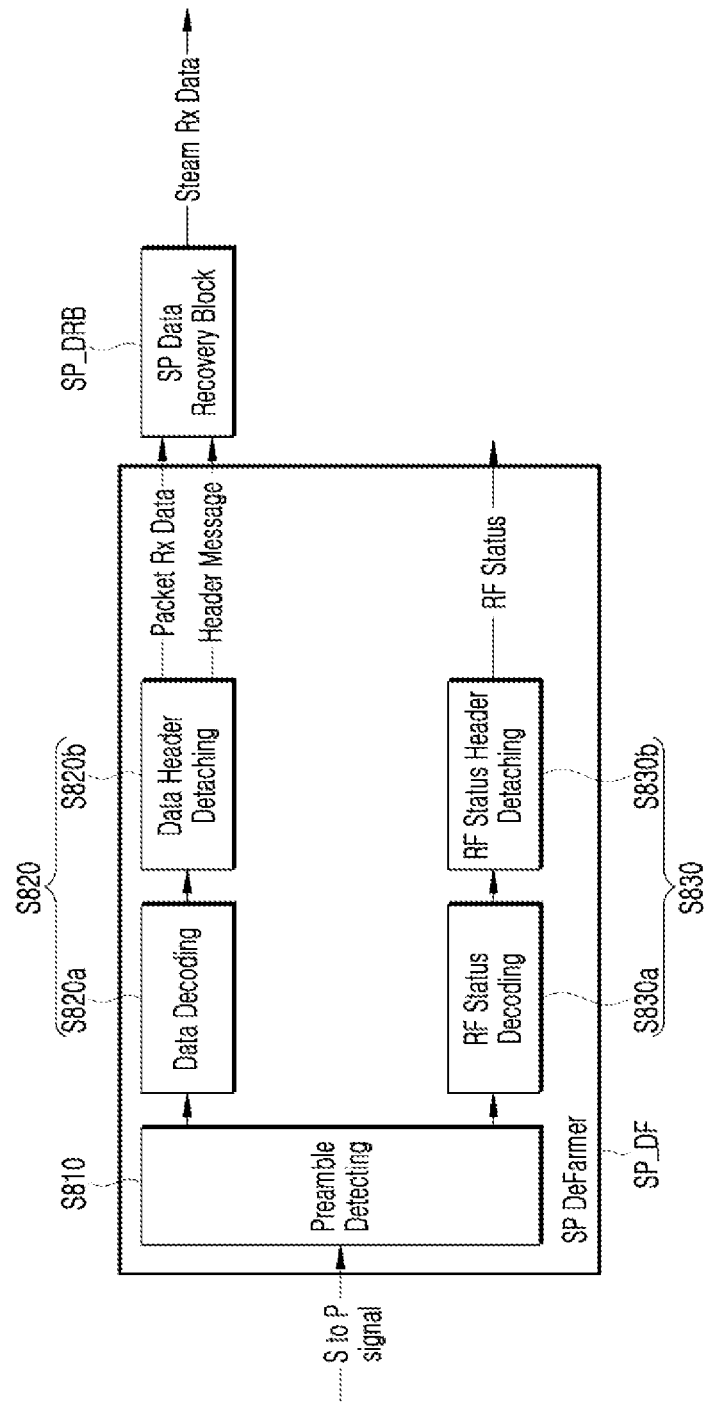

FIG. 4 is a block diagram illustrating, in detail, a function of the communication device 100 according to an embodiment of the present disclosure. For a more detailed description, FIGS. 5 to 8 may be referred to together. FIGS. 5 and 6 are diagrams illustrating an operation of the communication device 100 in a transmission (Tx) mode according to an embodiment of the present disclosure, and FIGS. 7 and 8 are diagrams illustrating an operation of the communication device 100 in a reception (Rx) mode according to an embodiment of the present disclosure.

Referring to FIG. 4, the communication device 100 may include the master (MAS) and the multiple slaves (DS) DS1 to DSN, and may include the digital serial interfaces (DSI) DSI1 to DSN, which are serial communication interfaces and each of which is disposed between the master (MAS) and each of the slaves (DS) DS1 to DSN.

The master (MAS) may be a configuration for controlling a communication modem (Mod), may be a configuration indicating a function. The master (MAS) may include the SP paths (SP) SP1 to SPM corresponding to the communication modem (Mod) and the antenna paths, and distributed paths (DSP) DSP1 to DSPN coupled one-to-one with the multiple slaves (DS) DS1 to DSN. The number of the distributed paths (DSP) DSP1 to DSPN is the same as the number of the multiple slaves (DS) DS1 to DSN, and the distributed paths may be coupled one-to-one with the slaves.

The SP paths (SP) SP1 to SPM and the distributed paths (DSP) DSP1 to DSPN may be mapped to each other, and the number of the SP paths (SP) SP1 to SPM may be implemented to be less than the number of the distributed paths (DSP) DSP1 to DSPN, but the embodiment is not limited thereto. If the number of the SP paths (SP) SP1 to SPM is implemented to be less than the number of the distributed paths (DSP) DSP1 to DSPN, the device may be controlled more efficiently, and this is because the number of the distributed antennas used for actual transmission and reception may be limited while widening a coverage by disposing the number of the distributed antennas widely.

In addition, since the SP paths (SP) SP1 to SPM are paths for allowing the communication device 100 to simultaneously process transmission or reception, and the master (MAS) may transmit or receive data, based on the number of the SP paths (SP) SP1 to SPM. Accordingly, the cost of a transmission/reception circuit can be economically saved, and the same may be applied to an existing communication modem.

The master (MAS) may map each of the SP paths (SP) SP1 to SPM and the distributed paths (DSP) DSP1 to DSPN differently. The master (MAS) may determine a slave for transmission or reception by monitoring channel qualities of the distributed paths (DSP) DSP1 to DSPN.

The master (MAS) may measure a channel quality of each of the multiple distributed paths (DSP) DSP1 to DSPN at a predetermined period and each time data is transmitted and received, and map the distributed paths (DSP) DSP1 to DSPN and the SP paths (SP) SP1 to SPM, based on the measured channel quality.

Specifically, the master (MAS) may map the distributed paths (DSP) DSP1 to DSPN according to the number (M) of the SP paths (SP) SP1 to SPM, and the master (MAS) may map M distributed paths having a high power intensity among the distributed paths (DSP) DSP1 to DSPN to the SP paths (SP) SP1 to SPM, and map M distributed paths having a high received signal intensity (SNR) to the SP paths (SP) SP1 to SPM.

In addition, the master (MAS) may select M slaves spaced a predetermined distance apart from each other. Accordingly, when a radio shadow area of the communication device 100 occurs, data may be transmitted or received with higher reliability. In the case where the master (MAS) selects multiple antennas spaced a predetermined distance apart from each other, higher reliability may be provided than the case where the master selects multiple antennas having an excellent channel quality but closely arranged.

The master (MAS) may select a slave in proper consideration of a received power intensity (reception intensity) and a distance between slaves.

For example, as shown in FIG. 2, when the multiple slaves DS1 to DS4 are configured and there are two SP paths SP1 and SP2, it may be assumed that a reception power intensity of a first slave DS1 is 10 dB, a reception power intensity of a second slave DS2 is 7 dB, a reception power intensity of a third slave DS3 is 9 dB, and a reception power intensity of a fourth slave DS4 is 8 dB.

In this case, the master (MAS) may simultaneously select two slaves according to the number of the SP paths. Considering a reception power intensity in a specific time zone, the first slave DS1 and the third slave DS3 may be selected, and the first slave DS1 and the second slave DS2 which are far apart from each other may be selected in order to perform communication with high reliability.

To this end, the master (MAS) may select slaves corresponding to the SP paths SP1 and SP2, based on information such as a region, a time, a traveling path, and a traveling time, and may be performed by an operation by artificial intelligence.

As described above, the master (MAS) may simultaneously perform signal processing (transmission or reception) as many as the number corresponding to the SP paths SP1 to SPM, and transmit or receive data through the slaves coupled to the distributed paths, based on the channel qualities of the distributed paths. In this case, the SP paths and the distributed paths may be mapped one-to-one, and the mapping may be changed in real time.

Hereinafter, a process in which the communication device 100 transmits data to a network in a transmission mode will be described.

The master 100 may simultaneously perform processing on stream-based Tx Data and RF control signals in a first SP path SP1 to an Mth SP path SPM.

Upon transmission (Tx), the master 100 may generate, as a Tx packet, a Tx data signal and an RF control signal which are input, by using a signal processing framer (SP_F) in each of the SP paths (SP) SP1 to SPM.

Specifically, when the first SP path SP1 is described with reference to FIG. 5, the SP framer (SP_F) of the master 100 packetizes each of a Tx data signal and an RF control signal (S510*a* and S520*a*), adds a header including a sequence number to the packetized Tx data signal and the packetized RF control signal (S510*b* and S520*b*), performs data encoding for error recovery (S510*c* and S520*c*), and adds a preamble to the encoded data (S510*d*, S520*d*, and S530), so as to generate a Tx packet. The SP framer (SP_F) may generate a Tx packet through an MUX (S540) giving priority to an RF control signal, and may make transmission of a Tx data packet wait until the RF control signal is transmitted. The master (MAS) may operate to give higher reliability to a control signal than a large amount of Tx data signal.

When the packet size of the RF control signal is small in operation S520*a*, the master (MAS) may uniformly packetize the size. The master (MAS) may distinguish a Tx data packet and an RF control packet through the preamble, and when there is no Tx data packet and RF control packet, generate and transmit an idle packet for constant transmission.

The master (MAS) may select one (for example, SP1) of one or more SP paths, and may provide a Tx packet to a distributed path mapped to the selected SP path SP1, through the selected first SP path SP1. When the distributed path mapped to the selected SP path SP1 is a first distributed path DSP1, the distributed path DSP1 may select the first SP path SP1 through an MUX (DSP_MUX).

The master (MAS) may determine a slave and a distributed path through which Tx data is to be transmitted to the network, based on the channel quality. For example, the master (MAS) may select the first SP path SP1 to transmit Tx data to the first slave DS1 through the first distributed path DSP1.

The master (MAS) may perform parallel to serial (P to S) encoding with respect to a Tx packet output through the MUX (DSP_MUX), in the distributed path DSP1 mapped to the selected SP path SP1, and transmit the encoded Tx data signal and RF control signal to the slave DS1 coupled to the distributed path DSP1 through the DSP1.

In relation to the P to S encoding, 8b/10b or 64b/66b encoding may be performed, but the embodiment is not limited thereto.

If the selected SP path SP1 is mapped to the first distributed path DSP1, the first slave DS1 coupled to the first distributed path DSP1 may receive the encoded TX data signal and RF control signal through a digital serial interface DSI1, and perform serial to parallel (S to P) decoding, so as to transmit the decoded signal to the network through an antenna. The S to P decoding may be performed according to an encoding scheme (for example, 8b/10b or 64b/66b).

When the first slave DS1 is selected and determined, a detailed operation of the slave will be described with reference to FIG. 6. A DS deframer (DS_DF) may detect preambles of a Tx data packet and an RF Control packet in a serial to parallel (S to P) decoded signal (S610), perform decoding for error recovery on each of the Tx data packet and the RF control packet (S620a and S630a), remove a header (S620b and S630b), and provide packetized Tx data and a header message to a DS data recovery block (DRB) (S640).

The RF control signal may be transmitted to an RF control block (RFCB of FIG. 4), and when a Tx data signal is transmitted using an RF module (DS_RFM), necessary control information may be transmitted. In the case of the RF control signal, the RF control signal has a small size and thus may be transmitted with high reliability.

The DS data recovery block (DS_DRB) may remove noise, based on the packetized Tx data and the header message, and when a part of the packetized Tx data is lost, recover a lost packet. Specifically, a previous data value or a NULL value may be added to a lost area. Accordingly, system problems such as rebooting and malfunction of the communication device 100 can be prevented.

Hereinafter, an operation of the communication device 100 in a reception mode (Rx) will be described. The communication device 100 may receive both of an Rx data signal and an RF status signal through each of the multiple slaves (DS) DS1 to DSN.

Each of the multiple slaves (DS) DS1 to DSN may receive a signal through the provided RF module (for example, DS_RFM).

For example, the first slave DS1 may generate, as an Rx packet, an Rx data signal and an RF status signal which are input, by using a DS framer (DS_F) upon reception (Rx). The RF status signal may include an AGC gain value, an RSSI gain value, and the like.

The first slave DS1 may perform parallel to serial (P to S) encoding, and transmit, as an RX packet, the encoded signal to the distributed path DSP1 coupled to each of the slaves through the digital serial interface DSI1.

The master (MAS) may perform S to P decoding in each of the multiple distributed paths (DSP) DSP1 to DSPN. In addition, the master (MAS) may select a distributed path (typically, DSP1 of DS1). This may be performed in an MUX (typically, SP_MUX of SP1) on the SP path mapped to the distributed path.

The master (MAS) may receive an input of the S to P decoded signal so as to generate an Rx data signal and an RF status signal through an SP deframer (SP_DF).

Hereinafter, the reception mode (Rx) will be described in more detail, but a process of reception from the first slave DS1 to the first SP path SP1 will be described. The process will be described with reference to FIGS. 7 and 8 together.

The DS framer (DS_F) of the first slave DS1 may packetize each of an Rx data signal and an RF status signal (S710a and S720a), add a header including a sequence number to the packetized Rx data signal and the packetized RF status signal (S710b and S720b), perform data encoding (S710c and S720c), and add a preamble to the encoded data (S710d, S720d, and S730), so as to generate an Rx packet. In this case, by giving more weighting to the RF status signal in an MUX (S740) process, the Rx data signal may be stored until all RF status signals are received.

The DS framer (DS_F) may perform P to S encoding to provide the encoded signal to the first distributed path DSP1 coupled to the first slave DS1. The first distributed path DSP1 may perform S to P decoding to transmit the Rx packet to the first SP path SP1 mapped to the first distributed path DSP1.

The SP deframer (SP_DF) of the master (MAS) may detect preambles of an Rx data packet and an RF status packet in the S to P decoded signal (S810), perform decoding with respect to each of the Rx data packet and the RF status packet (S820a and S830a), remove a header (S820b and S830b), and provide packetized Rx data and a header message to an SP data recovery block (SP_DRB).

The SP data recovery block (SP_DRB) may recover a lost part in the Rx data signal like a Tx data signal.

Hereinafter, an operation process of a communication device disposed in a vehicle (including an autonomous vehicle) will be described with reference to FIGS. 9 and 10. For description, a communication device will be described as an autonomous vehicle.

Figure 9:
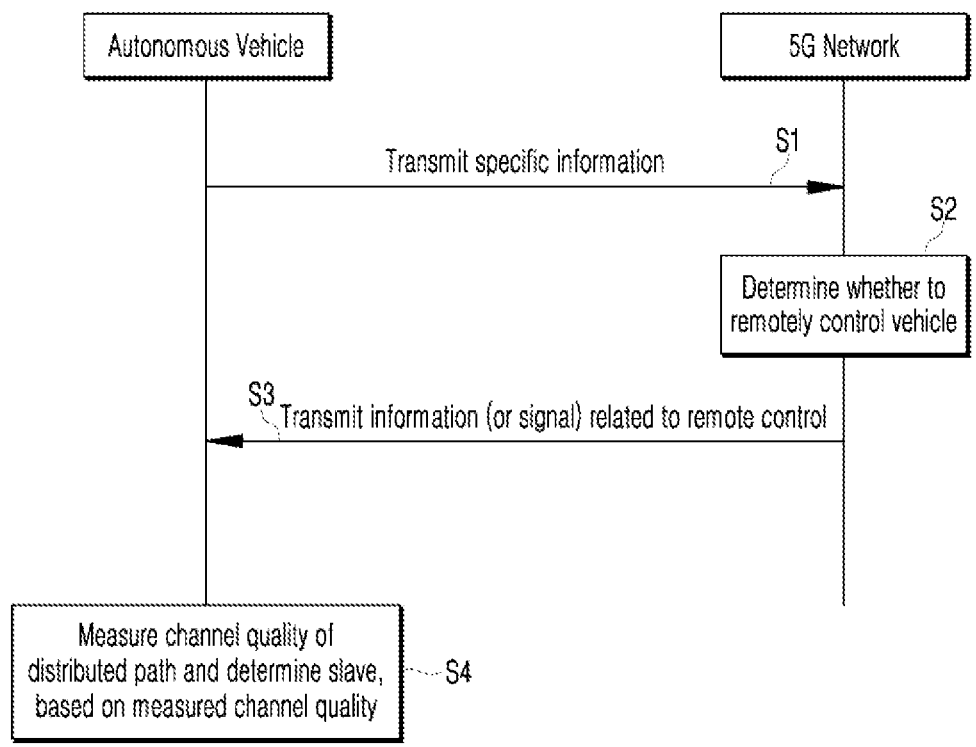
FIGS. 9 and 10 are sequence diagrams illustrating an operation of a communication device mounted on an autonomous vehicle according to an embodiment of the present disclosure.
Figure 10:
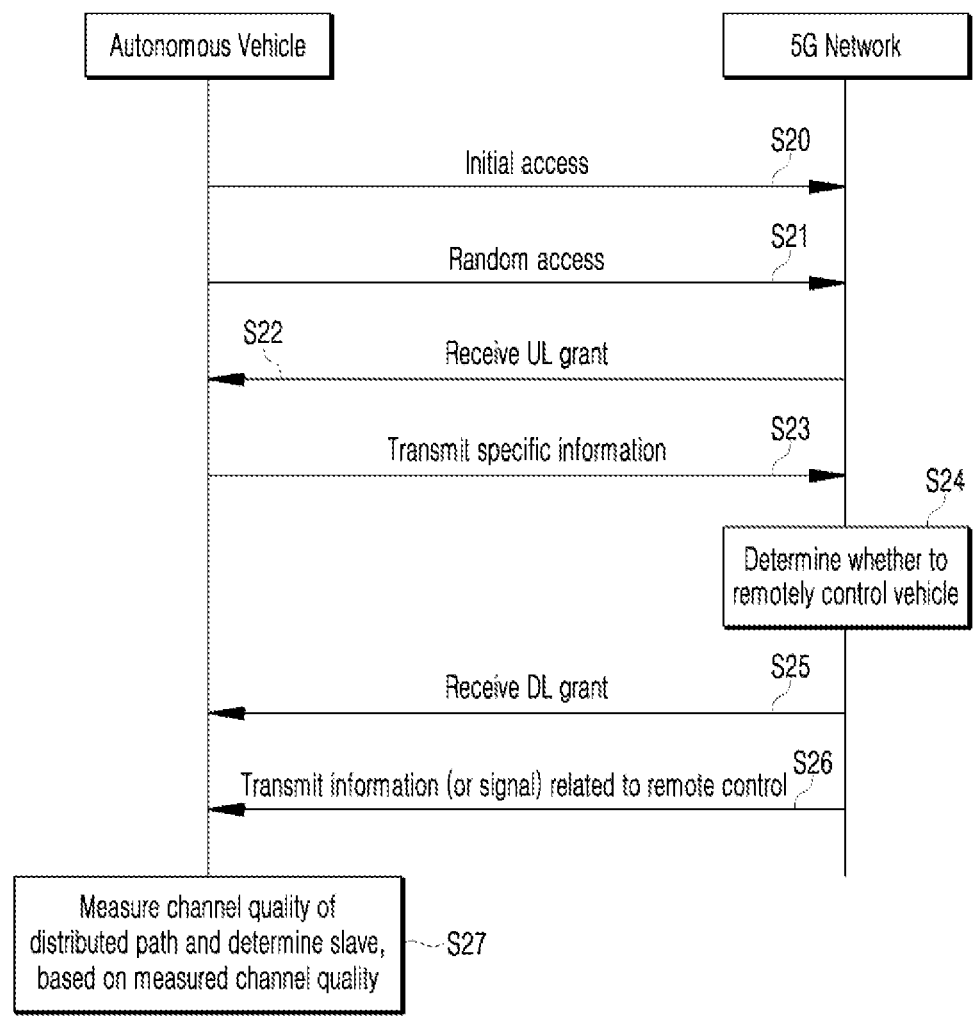

FIGS. 9 and 10 are sequence diagrams illustrating an operation of a communication device mounted on an autonomous vehicle according to an embodiment of the present disclosure.

FIG. 9 illustrates an example of basic operations of an autonomous vehicle and a 5G network in a 5G communication system.

The autonomous vehicle transmits specific information to the 5G network (S1).

The specific information may include autonomous driving-related information.

The autonomous driving-related information may be information directly related to driving control of the vehicle. For example, the autonomous driving-related information may include one or more of object data indicating an object around the vehicle, map data, vehicle state data, vehicle location data, and driving plan data.

The autonomous driving-related information may further include service information required for autonomous driving. For example, the specific information may include information on a destination and a vehicle stability level which are input through a user terminal. In addition, the 5G network may determine whether to remotely control the vehicle (S2).

The 5G network may include a server or a module configured to perform autonomous driving-related remote control.

In addition, the 5G network may transmit information (or a signal) related to the remote control to the autonomous vehicle (S3).

As described above, the information related to the remote control may be a signal directly applied to the autonomous vehicle, and may further include service information required for autonomous driving.

The autonomous vehicle may measure a channel quality of a distributed path, and determine a slave, based on the measured channel quality (S4).

FIG. 10 schematically illustrates an essential process (for example, an initial access procedure between a vehicle and a 5G network, etc.) for 5G communication between an autonomous vehicle and a 5G network according to an embodiment of the present disclosure.

FIG. 10 illustrates an example of application operations of an autonomous vehicle and a 5G network in a 5G communication system.

The autonomous vehicle performs an initial access procedure with the 5G network (S20).

The initial access procedure includes a cell search for acquiring a downlink (DL) operation, a process of acquiring system information, and the like.

The autonomous vehicle performs a random access procedure with the 5G network (S21).

The random access process may include preamble transmission and random access response reception processes for acquiring uplink (UL) synchronization or transmitting UL data.

In addition, the 5G network transmits a UL grant for scheduling transmission of specific information to the autonomous vehicle (S22).

Reception of the UL grant includes a process for time/frequency resource scheduling to transmit UL data to the 5G network.

In addition, the autonomous vehicle transmits the specific information to the 5G network, based on the UL grant (S23).

In addition, the 5G network determines whether to remotely control the vehicle (S24).

In addition, the autonomous vehicle receives a DL grant through a physical downlink control channel in order to receive a response to the specific information from the 5G network (S25).

In addition, the 5G network transmits information (or a signal) related to remote control to the autonomous vehicle, based on the DL grant (S26).

The autonomous vehicle may measure a channel quality of a distributed path, and determine a slave, based on the measured channel quality (S27).

The present disclosure described above can be implemented as a computer-readable code on a medium in which a program is recorded. A computer-readable medium includes all types of recording devices in which data readable by a computer system is stored. An example of the computer-readable medium may include a hard disk drive (HDD), a solid state disk (SSD), a silicon disk drive (SDD), a ROM, an RAM, a CD-ROM, a magnetic tape, a floppy disk, an optical data storage device, etc., in addition, the computer may include a master (MAS) of a communication device 100.

In the foregoing, while specific embodiments of the present disclosure have been described for illustrative purposes, the scope of the present disclosure is not limited thereto, and it will be understood by those skilled in the art that various changes and modifications can be made to other specific embodiments without departing from the idea and the scope of the present disclosure. Therefore, the scope of the present disclosure should be defined not by the above-described embodiments but by the technical idea defined in the following claims.

What is claimed is:

1. A communication device comprising:
multiple slaves (DS) each comprising an antenna; and
a master which comprises a baseband modem, is disposed to be spaced a predetermined distance apart from each of the multiple slaves, is connected to each of the multiple slaves through a digital serial interface, and comprises multiple distributed paths coupled one-to-one with the multiple slaves, respectively,
wherein the master is configured to
measure a channel quality of each of the multiple distributed paths, and
determine at least one slave to be used for transmitting or receiving data, based on the measured channel quality,
wherein the master comprises one or more signal processing (SP) paths which can be mapped to the multiple distributed paths, and is configured to transmit or receive data by one-to-one mapping the distributed paths coupled to the determined at least one slave to the SP paths,
wherein the master is configured to
measure the channel quality of each of the multiple distributed paths at a predetermined period and each time data is transmitted and received, and map the distributed paths and the SP paths, based on the measured channel quality,
wherein the master is configured to
in each of the one or more SP paths, upon transmission (Tx), generate, as a Tx packet, a Tx data signal and an RF control signal which are input, by using a signal processing framer (SP framer), and
select one of the one or more SP paths, and provide, through the selected SP path, the Tx packet to a distributed path mapped to the selected SP path.

2. The communication device of claim 1, wherein a number of the multiple distributed paths is configured to be greater than a number of the SP paths.

3. The communication device of claim 1, wherein the master is configured to
perform parallel to serial (P to S) encoding on the Tx packet in the distributed path mapped to the selected SP path, and transmit an encoded Tx data signal and RF control signal to a slave coupled to the distributed path, through the digital serial interface.

4. The communication device of claim 3, wherein the slave coupled to the distributed path mapped to the selected SP path is configured to
receive an encoded Tx data signal and RF control signal through the digital serial interface, perform serial to parallel (S to P) decoding, and transmit a decoded signal to a network through the antenna.

5. The communication device of claim 4, wherein, upon transmission (Tx), in the selected SP path, the SP framer is configured to
packetize each of a Tx data signal and an RF control signal, add a header comprising a sequence number to the packetized Tx data signal and the packetized RF control signal, perform data encoding, and add a preamble to encoded data so as to generate a Tx packet, and a distributed slave (DS) deframer of the slave coupled to the distributed path mapped to the selected SP path is configured to detect preambles of a Tx data packet and an RF control packet in an S to P decoded signal, perform decoding with respect to each of the Tx data packet and the RF control packet, remove a header, and provide packetized Tx data and a header message to a DS data recovery block (DRB).

6. The communication device of claim 5, wherein the DS data recovery block is configured to remove noise, based on the packetized Tx data and the header message, and when a part of the packetized Tx data is lost, recover a lost packet.

7. The communication device of claim 1, wherein the communication device is mounted on a vehicle, and the master is configured to measure the channel quality of each of the distributed paths with respect to a signal received in a 5G network, and determine the at least one slave to be used for transmitting or receiving the data, based on the measured channel quality.

8. A communication device comprising:

multiple slaves (DS) each comprising an antenna; and a master which comprises a baseband modem, is disposed to be spaced a predetermined distance apart from each of the multiple slaves, is connected to each of the multiple slaves through a digital serial interface, and comprises multiple distributed paths coupled one-to-one with the multiple slaves, respectively, wherein the master is configured to measure a channel quality of each of the multiple distributed paths, and determine at least one slave to be used for transmitting or receiving data, based on the measured channel quality, wherein the master comprises one or more signal processing (SP) paths which can be mapped to the multiple distributed paths, and is configured to transmit or receive data by one-to-one mapping the distributed paths coupled to the determined at least one slave to the SP paths, wherein the master is configured to measure the channel quality of each of the multiple distributed paths at a predetermined period and each time data is transmitted and received, and map the distributed paths and the SP paths, based on the measured channel quality, wherein, upon reception (Rx), each of one or more slaves (DS) is configured to generate, as an Rx packet, an Rx data signal and an RF status signal which are input, by using a DS framer, and perform P to S encoding, and provide an encoded signal to the distributed paths coupled to the slaves, respectively, through the digital serial interface, and the master is configured to perform S to P decoding of an encoded signal, which has been input through at least one distributed path, into an S to P decoded signal, select one of the at least one distributed path, and provide the S to P decoded signal to an SP path mapped to the selected distributed path.

9. The communication device of claim 8, wherein a number of the multiple distributed paths is configured to be greater than a number of the SP paths.

10. The communication device of claim 8, wherein the master is configured to receive an input of the S to P decoded signal so as to generate an Rx data signal and an RF status signal through an SP deframer.

11. The communication device of claim 10, wherein, upon reception (Rx), the DS framer of each of the one or more slaves is configured to packetize each of an Rx data signal and an RF status signal, add the header comprising a sequence number to the packetized Rx data signal and the packetized RF status signal, perform data encoding, and add a preamble to encoded data so as to generate an Rx packet, and the SP deframer of the master is configured to detect preambles of an Rx data packet and an RF status packet in the S to P decoded signal, perform decoding with respect to each of the Rx data packet and the RF status packet, remove a header, and provide packetized Rx data and a header message to an SP data recovery block (DRB).

12. The communication device of claim 11, wherein the SP data recovery block is configured to remove noise, based on the packetized Rx data and the header message, and when a part of the packetized Rx data is lost, recover a corresponding part.

* * * * *